3,557,185
STABILIZED ALPHA-CYANOACRYLATE
ADHESIVE COMPOSITIONS
Kenji Ito and Kishichiro Kondo, Nagoya-shi, Japan, assignors to Toa Gosei Chemical Industry Co., Ltd., Tokyo, Japan
No Drawing. Filed Mar. 6, 1968, Ser. No. 710,738
Claims priority, application Japan, Mar. 6, 1967, 42/11,402
Int. Cl. C07c *121/52, 121/30*
U.S. Cl. 260—465.4      5 Claims

ABSTRACT OF THE DISCLOSURE

Alpha-cyanoacrylate adhesive compositions consisting predominantly of monomeric alpha-cyanoacrylate stabilized with sulfur trioxide in a quantity sufficient to stabilize in bulk.

BACKGROUND OF THE INVENTION

The present invention relates generally to stable adhesive compositions and more particularly to stable alpha-cyanoacrylate adhesive compositions of which the polymerization is suppressed during storage while the compositions are polymerized in a quite short period of time when used an an adhesive.

It is known that an alpha-cyanoacrylate monomer represented by the general formula:

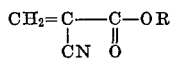

wherein R is a member of the group consisting of alkyl group of 1 to 16 carbon atoms, a cyclohexyl group, a phenyl group or the like are auto-polymerizable when spread in a thin film by a small amount of water in air in a short period of from a few seconds to a few minutes without the necessity of a catalyst. By using the monomer as an adhesive composition a very strong adhesive bond strength can be obtained.

Thus, by utilizing the aforesaid property, the alpha-cyanoacrylate monomer is used for bonding all kinds of organic and inorganic materials such as rubbers, plastics, fibers, leathers, metals and the like. For example, the monomer is employed as an adhesive for various parts of electric goods precision machines, and household furnishes as well as for bonding blood vessels in surgical operations. Furthermore, the monomer is utilized as a filler for teeth in dental cures.

While the alpha-cyanoacrylate monomer is widely used in many fields, as mentioned above, it has one important fault: when the monomer is stored at normal temperatures, even in a closed vessel, free from moisture in the air, the monomer will self-polymerize in a comparatively short period of time and the period is shortened as the storing temperature is increased.

Therefore, for improving the storage stability of the alpha-cyanoacrylate monomer there are employed combinations of gaseous acid, anion-polymerization preventing agents such as sulfur dioxide, nitrogen dioxide and hydrogen fluoride and free radical polymerization preventing agents such as hydroquinone, tert.-butyl catechol, and hydroquinone monomethyl ether as disclosed in U.S. Pats. Nos. 2,794,788 and 2,765,332.

However, since the anion-polymerization preventing agent, which is a main component for conventionally employed stabilizers, is in a gaseous state at normal temperatures, as mentioned above, in the case of adding a definite amount of a part of the anion-polymerization preventing agent added to the alpha-cyanoacrylate monomer will escape undissolved, which makes it difficult to add accurate amounts of the agent to the system. Moreover, when the monomer, having incorporated therein the anion-polymerization preventing agent, is stored for a long period of time or stored while being used intermittently, the agent will escape spontaneously from the monomer. Therefore, it is difficult to provide a sufficient or complete stability to an alpha-cyanoacrylate monomer.

SUMMARY OF THE INVENTION

An object of the present invention is to provide a stabilizer for alpha-cyanoacrylate monomer which can be incorporated in the alpha-cyanoacrylate monomer and which does not escape readily from the monomer during storage.

Another object of the invention is to provide stable alpha-cyanoacrylate adhesive compositions containing the aforesaid improved stabilizer.

These objects of this invention can be attained by incorporating in an alpha-cyanoacrylate monomer from about 0.001 to about 0.07% by weight of sulfur trioxide, based on the weight of the monomer, as a stabilizer.

The alpha-cyanoacrylate adhesive compositions of this invention, containing the small quantity of sulfur trioxide, can be stored stably even at high temperatures and even for very long periods of time at normal temperatures, which relatively no polymerization of the alpha-cyanoacrylate monomer.

However, when adhesive compositions of this invention is formed into a thin film for use as an adhesive, the alpha-cyanoacrylate is polymerized instantly without heat, pressure, or in particular, without the presence of catalysts as in the case of using an alpha-cyanoacrylate monomer containing no such stabilizer. Moreover, the adhesive composition of this invention shows a high adhesive strength.

DETAILED DESCRIPTION OF THE INVENTION

The proportion of sulfur trioxide in this invention is preferably from about 0.001 to about 0.07% by weight based on the weight of the alpha-cyanoacrylate monomer used. If the proportion of the additive is less than this range, it does not provide sufficient stability to the alpha-cyanoacrylate adhesive compositions. On the other hand, if the proportion is larger than this range, it takes a long period of time to polymerize the monomer, which reduces the strength of the adhesion, and also the alpha-cyanoacrylate monomer is markedly yellow colored, which lowers the commercial value of the adhesive compositions.

Further, the alpha-cyanoacrylate adhesive compositions containing only sulfur trioxide as a stabilizer can be stably stored for all practical purposes but where higher stability is required, it is effective to add sulfur trioxide together with a well-known radical polymerization preventing agent such as tert.-butyl catechol, thiosemicarbazide, pyrogallol, di-β-naphthol, hydroquinone, hydroquinone monomethyl ether, and the like. Among these radical polymerization preventing agents, hydroquinone or hydroquinone monomethyl ether is particularly effective and can be incorporated in the alpha-cyanoacrylate monomer in an amount of from about 0.005 to about 0.5% by weight of the monomer. The stability at high temperatures of the adhesive compositions so treated is remarkably improved. Furthermore, conventionally known anion-polymerization preventing agents may be added to the adhesive compositions of this invention if necessary.

As practical examples of the alpha-cyanoacrylate monomer used in this invention, there are illustrated methyl alpha-cyanoacrylate, ethyl alpha-cyanoacrylate, n-propyl alpha-cyanoacrylate, iso-propyl alpha-cyanoacrylate, butyl alpha-cyanoacrylate, iso-butyl alpha-cyanoacrylate, amyl alpha-cyanoacrylate, cyclohexyl alpha-cyanoacrylate, lauryl alpha-cyanoacrylate, capyryl alpha-cyanoacrylate and the like.

Since alpha-cyanoacrylate has a high permeability, when using compositions containing the alpha-cyanoacrylate for porous materials such as papers, leathers, woods, cloths, and the like, a viscosity increasing agent such as an alkyl alpha-cyanoacrylate polymer, an acrylic acid ester polymer, a methacrylic acid ester polymer, a cellulose ester, e.g. acetyl cellulose, and the like, may be added to the compositions. In the present invention, such an additive may also be added to the alpha-cyanoacrylate adhesive compositions of this invention without lowering the stability.

The invention will further be explained by reference to the following example.

EXAMPLE

Adhesive compositions were prepared by adding sulfur trioxide alone or together with hydroquinone monomethyl ether (MEHQ) to an ethyl, methyl, n-butyl, isopropyl, or 2-ethylhexyl ester of alpha-cyanoacrylic acid and the adhesive compositions thus prepared and sample containing no additives for comparing were measured about the stability and adhesive strength, the results of which are shown in Tables 1 through 4.

In the experiments, the stability test was conducted with the sample after placing 15 g. of the sample in a 20 ml. polyethylene vessel, closing the vessel without purging the air in the space in the vessel with an inert gas, and allowing the vessel to stand for a definite period at room temperature or placing it in a chamber equipped with a thermostat.

In order to confirm that the adhesive compositions of this invention are stable at normal temperatures as well as at higher temperatures, the stability test was conducted at room temperature and at a temperature of 60° C.

Also, the adhesive strength was measured as follows: about 0.005 g. of the sample before or after preservation was applied to a section of a test piece of hard polyvinyl chloride 5 mm. thick, 20 mm. wide and 35 mm. long. Further, another test piece of the same material was bonded to the section, whereby an area of adhesion is 100 mm.² After 24 hours, the tensile strength of the bonded portion was measured by using an Amsler-type tension test machine.

The "stabilized period of time" in the tables is a period during which the alpha-cyanoacrylate loses its water-like fluidity and the viscosity thereof begins to increase. The term "polymerized" shown in the columns of tensile strength in Table 2 and Table 4 means that, for example, in the case of storing at 60° C. in Example 21, when the sample was stored at 60° C. for two months, the sample had been polymerized and could not be used. The symbol "—" in the tables means that the measurement was omitted.

TABLE I.—STABILITY OF ALPHA-CYANOACRYLATE (ETHYL ALPHA-CYANOACRYLATE)

| Example No. | Quantity stabilizer in weight percent | | Temp., °C. room temp. designated as r.t. | Stabilized periods of time |
|---|---|---|---|---|
| | Sulfur trioxide | MEHQ | | |
| 1 | 0 | 0 | r.t. | 15 days. |
| 2 | 0 | 0 | 60 | 3 days. |
| 3 | 0 | 0.01 | 60 | 3 days. |
| 4 | 0.001 | 0 | r.t. | More than 6 months. |
| 5 | 0.001 | 0 | 60 | More than 1 month. |
| 6 | 0.001 | 0.01 | 60 | Do. |
| 7 | 0.005 | 0 | r.t. | More than 6 months. |
| 8 | 0.005 | 0 | 60 | More than 1 month. |
| 9 | 0.005 | 0.01 | 60 | Do. |
| 10 | 0.01 | 0 | r.t. | More than 6 months. |
| 11 | 0.01 | 0 | 60 | More than 1 month. |
| 12 | 0.01 | 0.01 | 60 | Do. |
| 13 | 0.05 | 0 | r.t. | More than 6 months. |
| 14 | 0.05 | 0 | 60 | More than 1 month. |
| 15 | 0.05 | 0.01 | 60 | Do. |
| 16 | 0.07 | 0 | r.t. | More than 6 months. |
| 17 | 0.07 | 0 | 60 | More than 1 month. |
| 18 | 0.07 | 0.01 | 60 | Do. |
| 19 | 0 | 0 | r.t. | More than 6 months. |

TABLE 2.—TENSILE STRENGTH (ETHYL ALPHA-CYANOACRYLATE)

| Example No. | Quantity stabilizer in wt. percent | | Temp., °C. storage period | Tensile strength, kg./cm.² | | | | | | | |
|---|---|---|---|---|---|---|---|---|---|---|---|
| | Sulfur trioxide | MEHQ | | 0 | 3 days | 5 days | 10 days | 15 days | 1 mo. | 2 mo. | 3 mo. | 6 mo. |
| 20 | 0 | 0 | 60 | 420 | (¹) | | | | | | | |
| | | | 40 | 420 | — | 370 | (¹) | | | | | |
| | | | 20 | 420 | — | — | 320 | (¹) | | | | |
| 21 | 0.005 | 0 | 60 | 430 | — | 436 | 350 | — | 180 | (¹) | | |
| | | | 40 | 430 | — | 425 | — | 365 | — | 150 | (¹) | |
| | | | 20 | 430 | — | — | 410 | — | 380 | 280 | 250 | 120 |
| 22 | 0.01 | 0.01 | 60 | 430 | — | 445 | — | 370 | — | — | — | — |
| | | | 40 | 430 | — | 420 | — | 365 | 340 | — | 140 | — |
| | | | 20 | 430 | — | 438 | — | — | 365 | 305 | 200 | 142 |
| 23 | 0.05 | 0.01 | 60 | 415 | — | 368 | — | 314 | 220 | — | — | — |
| | | | 40 | 415 | — | 390, | — | 361 | 330 | — | 105 | — |
| | | | 20 | 415, | —, | 405 | — | — | 355 | 300 | — | 130 |

¹ Polymerized.

TABLE 3.—STABILITY OF ALPHA-CYANOACRYLATE

| Example No.: | Used stabilizer in weight percent | | Temp., °C. Room temp. (r.t.) | Stabilized periods of time | | | |
|---|---|---|---|---|---|---|---|
| | Sulfur trioxide | MEHQ | | Methyl alphacyanoacrylate | n-Butyl alpha-cyanoacrylate | Isopropyl alpha-cyanoacrylate | 2-ethylhexyl alpha-cyanoacrylate |
| 24 | 0 | 0 | r.t. | 12 days | 14 days | 15 days | 12 days. |
| | 0 | 0 | 60 | 2 days | 2 days | 3 days | 2 days. |
| | 0 | 0.01 | 60 | do | do | do | Do. |
| 25 | 0.003 | 0 | r.t. | More than 6 months | More than 6 months | More than 6 months | More than 6 months. |
| | 0.003 | 0 | 60 | More than 20 days | More than 20 days | More than 20 days | More than 20 days. |
| 26 | 0.005 | 0 | r.t. | More than 6 months | More than 6 months | More than 6 months | More than 6 months. |
| | 0.005 | 0 | 60 | More than 1 month | More than 1 month | More than 1 month | More than 1 month. |
| 27 | 0.007 | 0 | r.t. | More than 6 months | More than 6 months | More than 6 months | More than 6 months. |
| | 0.007 | 0 | 60 | More than 1 month | More than 1 month | More than 1 month | More than 1 month. |
| 28 | 0.003 | 0.01 | r.t. | More than 6 months | More than 6 months | More than 6 months | More than 6 months. |
| | 0.003 | 0.01 | 60 | More than 20 days | More than 20 days | More than 20 days | More than 20 days. |
| 29 | 0.005 | 0.01 | r.t. | More than 6 months | More than 6 months | More than 6 months | More than 6 months. |
| | 0.005 | 0.01 | 60 | More than 1 month | More than 1 month | More than 1 month | More than 20 days. |
| 30 | 0.007 | 0.01 | r.t. | More than 6 months | More than 6 months | More than 6 months | More than 6 months. |
| | 0.007 | 0.01 | 60 | More than 1 month | More than 1 month | More than 1 month | More than 20 days. |

TABLE 4.—TENSILE STRENGTH

| Monomer | Quantity stabilizer in wt. percent | | Temp., °C. | Tensile strength, kg./cm.$^2$ | | | | | |
| --- | --- | --- | --- | --- | --- | --- | --- | --- | --- |
| | Sulfur trioxide | MEHQ | | 0 mo. | 1 mo. | 2 mo. | 3 mo. | 4 mo. | 6 mo. |
| Example No.: | | | | After 12 days | | | | | |
| 31 .......... Methyl-alpha-cyanoacrylate | 0 | 0 | 20 | 326 | ($^1$) | | | | |
| | | | 40 | 325 | "7" | | | | |
| | | | 60 | 325 | "2" | | | | |
| | 0.005 | 0 | 20 | 326 | 318 | 281 | 252 | 184 | 104 |
| | | | 40 | 326 | 275 | 182 | 62 | — | — |
| | | | 60 | 326 | 184 | 46 | — | — | — |
| | 0.005 | 0.01 | 20 | 322 | 315 | 276 | 246 | 180 | 111 |
| | | | 40 | 322 | 281 | 178 | 59 | — | — |
| | | | 60 | 322 | 179 | 49 | — | — | — |
| | | | | After 14 days | | | | | |
| 32 .......... n-Butyl alpha-cyanoacrylate | 0 | 0 | 20 | 284 | ($^1$) | | | | |
| | | | 40 | 284 | "8" | | | | |
| | | | 60 | 284 | "2" | | | | |
| | 0.005 | 0 | 20 | 388 | 274 | 221 | 189 | 137 | 67 |
| | | | 40 | 288 | 226 | 132 | 18 | — | — |
| | | | 60 | 288 | 141 | 27 | — | — | — |
| | 0.005 | 0.01 | 20 | 281 | 266 | 230 | 161 | 136 | 59 |
| | | | 40 | 281 | 217 | 128 | 12 | — | — |
| | | | 60 | 281 | 140 | 26 | — | — | — |
| | | | | After 15 days | | | | | |
| 33 .......... iso-Alpha.propyl-cyanoacrylate | 0 | 0 | 20 | 275 | ($^1$) | | | | |
| | | | 40 | 275 | "7" | | | | |
| | | | 60 | 275 | "3" | | | | |
| | 0.005 | 0 | 20 | 276 | 238 | 204 | 170 | 108 | 38 |
| | | | 40 | 276 | 208 | 119 | 10 | — | — |
| | | | 60 | 276 | 133 | 17 | — | — | — |
| | 0.005 | 0.005 | 20 | 277 | 240 | 202 | 168 | 106 | 36 |
| | | | 40 | 277 | 212 | 128 | 14 | — | — |
| | | | 60 | 277 | 136 | 15 | — | — | — |
| | | | | After 12 days | | | | | |
| 34 .......... 2-ethylhexyl-alpha-cyanoacrylate | 0 | 0 | 20 | 131 | ($^1$) | | | | |
| | | | 40 | 131 | '6" | | | | |
| | | | 60 | 131 | '2" | | | | |
| | 0.003 | 0.01 | 20 | 130 | 122 | 113 | 92 | 58 | — |
| | | | 40 | 130 | 113 | 85 | 43 | — | — |
| | | | 60 | 130 | 81 | 62 | — | — | — |
| | 0.005 | 0 | 20 | 135 | 123 | 108 | 89 | 56 | — |
| | | | 40 | 135 | 109 | 81 | 44 | — | — |
| | | | 60 | 135 | 75 | 44 | — | — | — |
| | 0.005 | 0.01 | 20 | 132 | 120 | 105 | 88 | 56 | — |
| | | | 40 | 132 | 107 | 84 | 43 | — | — |
| | | | 60 | 132 | 66 | 37 | — | — | — |
| | 0.007 | 0 | 20 | 129 | 118 | 101 | 78 | 55 | — |
| | | | 40 | 129 | 104 | 82 | 43 | — | — |
| | | | 60 | 129 | 68 | 39 | — | — | — |

$^1$ Polymerized.

While the above has been described in connection with preferred embodiments of this invention, it will be obvious to those skilled in the art that various changes and modifications may be made therein without departing from the invention and as claimed. It is intended therefore, to cover in the appended claims all such changes and modifications which fall within the true spirit and scope of this invention.

What is claimed is:

1. A stable adhesive composition which comprises a monomeric ester of alpha-cyanoacrylic acid having the formula

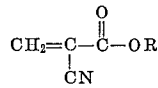

wherein R is selected from the group consisting of alkyl having from 1 to 16 carbon atoms, cyclohexyl and phenyl, and a stabilizing amount of sulfur trioxide.

2. The composition of claim 1 wherein said sulfur trioxide is present in an amount of from about 0.001% to about 0.07% by weight based on the weight of the ester.

3. The composition of claim 1 wherein said sulfur trioxide is present in an amount of from about 0.001 to about 0.07% by weight, based on the weight of the ester, and wherein the composition contains additionally from about 0.005 to about 0.5% by weight, based on the weight of the ester, of a compound selected from the group consisting of hydroquinone and hydroquinone monomehyl ether.

4. The composition of claim 1 wherein said monomeric ester is a lower alkyl ester of alpha-cyanoacrylic acid.

5. The composition of claim 4 wherein said monomeric ester is ethyl alpha-cyanoacrylate.

References Cited

UNITED STATES PATENTS 2,748,050   5/1956   Shearer et al. ____ 260—465.4X
3,254,111   5/1966   Hawkins et al. ____ 260—465.4
3,355,482   11/1967  Coover, Jr. et al. __ 260—465.4X JOSEPH P. BRUST, Primary Examiner U.S. Cl. X.R.

260—464, 465